UNITED STATES PATENT OFFICE 2,362,302

METHOD FOR DRYING PLASTIC MATERIAL

George A. Perry, Royal Oak, Mich., assignor to Carboloy Company, Inc., Detroit, Mich., a corporation of New York No Drawing. Application May 23, 1942, Serial No. 444,279

8 Claims. (Cl. 34—9)

This invention relates to a method for drying plastic materials, for example mixtures of metal powders and a plasticising medium. More particularly the present invention relates to a method for drying extruded or formed materials made by mixing powdered metals and a liquid plasticising medium. Such plasticising medium may be a mixture of starch with glycerine, starch with water and glycerine, gelatine and water, or equivalent material.

Taylor Patent No. 2,271,960, February 3, 1942, discloses an extrusion process in which metal compositions such as powered mixtures of tungsten carbide and cobalt or the like may be extruded in the form of rods, tubes, spirals and the like. In the patented process the extruded material, if less than 1/8" in thickness, may be dried in the open air or in an oven. Extruded material of greater thickness is placed in a suitable container which may be a carbon boat and heated to a temperature of 65° C. to 165° C. However, if the thickness of the extruded material exceeds about 1/4" in thickness there is a tendency for it to crack during drying and the tendency to crack increases with the thickness of the extruded material.

It is an object of the present invention to provide a simple, effective means whereby thick, pasty extruded or formed cemented carbide may be dried evenly and without cracking.

In carrying out my invention the extruded or formed material, if greater than 1/4" thick, is surrounded by a layer of common table salt, for example sodium chloride or the like. If the formed material is circular in cross section this may be accomplished by the use of a relatively long carbon mold which has a half round or semicircular longitudinal groove on one surface thereof. The groove should be slightly longer than the formed material to be dried and should have a diameter relatively greater than the diameter of the formed material. The groove is lined with common table salt to a depth of about 1/8". The formed material is placed on the salt lining and the upper half of the formed material covered with the salt. The embedded formed material is then heated in a reducing, neutral or other suitable flowing atmosphere and at a temperature and for a period of time sufficient to eliminate water, glycerine, or other liquid from the extruded or formed material. A progressive temperature range of about 40° to 180° C. is satisfactory for this purpose.

By embedding the extruded material in sodium chloride, it is possible to dry evenly very thick extruded material without cracking. For example, I have dried bars up to about 1" thick and the resulting product was entirely free from cracks. By employing a salt coating on the extruded or formed material during the drying operation, the usefulness of the process disclosed in the Taylor patent is greatly extended since it permits production by extrusion of many types of tools which formerly could not be produced by that process because of size limitations.

The problem involved in drying formed material such as pasty extruded cemented carbide, for examples mixtures of tungsten carbide and cobalt and a liquid plasticising medium, is not simply a question of slow drying. For example, I have dried slowly during a period of thirty days material having that composition and which was greater than 1/4" in thickness. The extruded material was embedded in different drying mediums such as sand, sawdust, calcium chloride and mustard seeds, the latter being employed because seeds have a great capacity for absorbing water. In each of these cases, however, the entruded material developed cracks.

In drying material by exposure to the atmosphere or in drying material in a closely fitted graphite container the surface dries more readily than the interior. As a result a rigid surface crust is formed before the central portion of the extruded material is dry. While the interior of the body dries and since shrinkage accompanies the drying process the interior of the body necessarily cracks for lack of material to make up for the shrinkage.

Common salt is not hygroscopic in the sense that it removes water from the surounding atmosphere nor that it dissolves in the water which it attracts. At least it is not hygroscopic in these ways at temperatures of 40 to 180° C. such as employed in the present salt drying process. However, even at these temperatures a mass of granulated salt will maintain as high a degree of humidity as the available moisture will allow.

In the presence of a moist body of extruded or formed material and under controlled temperatures the atmosphere in that portion of the salt nearest the moist body maintains a state of equilibrium with the latter during all stages of drying. In other words, the formed body dries from within and the humidity gradient between the salt and the body being dried is zero from the state of complete saturation of the body to that of complete dryness. Since at the temperatures employed in drying there must be an escape of moisture from the outside of the mass of salt and since the paste or moist body is the only source of moisture the body must in time lose all its moisture.

If desired, the rate of drying when employing a salt coating may be controlled by mixing the salt with inert material, such as alundum, or the moist body may be dried at higher temperatures to cause more rapid drying or the flow of the drying atmosphere, which in the present process preferably is hydrogen, may be increased. By varying these factors the most satisfactory drying rate for bodies of different sizes may be determined. For example, the rate of moisture flow from the surface of the formed material may be restricted or accelerated until it is greater than, equal to, or less than the flow of moisture from the center. In this manner, if desired, the outside surface may be dried first to thereby produce a hard surface with a porous center, or all parts may be dried at the same rate and time to produce a body of uniform density or the center may be dried first to produce a product with a maximum center density.

What I claim as new and desire to secure by Letters Patent of the United States is:

1. In a method for drying a wet or pasty cemented carbide composition, the step which comprises closely surrounding it with common salt.

2. In a method of drying a wet or pasty cemented carbide composition which is more than one-quarter inch thick, said method comprising embedding said composition in sodium chloride.

3. The method for drying a wet or pasty, formed cemented carbide composition which comprises embedding said composition in common salt and then heating it at a temperature sufficiently high to remove any moisture from said composition.

4. The method for drying a wet or pasty, formed cemented carbide composition which comprises applying heat to said composition while it is embedded in sodium chloride.

5. The method for drying a wet or pasty, extruded cemented carbide composition which comprises embedding it in common salt and heating it at a temperature and for a period of time sufficient to eliminate any liquid from the extruded material.

6. The method for drying a wet or pasty, formed cemented carbide composition more than one-quarter inch thick which comprises embedding said composition in common salt and then heating it at temperatures within the range of about 40 to 180° C. to thereby remove any moisture from said composition.

7. The method for drying a pasty cemented carbide composition which comprises embedding it in sodium chloride and progressively heating the embedded material from a temperature of about 40° C. to 180° C. in a flowing atmosphere to thereby control the removal of moisture from said composition.

8. The method for drying a pasty cemented carbide composition which comprises embedding it in sodium chloride and progressively heating the embedded material from a temperature of about 40° C. to 180° C. in a flowing hydrogen atmosphere to thereby control the removal of moisture from said composition.

GEORGE A. PERRY.